United States Patent
Jankevics et al.

(10) Patent No.: US 9,898,833 B1
(45) Date of Patent: Feb. 20, 2018

(54) APPARATUS AND METHOD FOR DETERMINING THE DIMENSIONS OF A PACKAGE WHILE IN MOTION

(71) Applicant: Northrop Grumman Systems Corporation, Falls Church, VA (US)

(72) Inventors: Andrew J. Jankevics, Westford, MA (US); Cameron D. Dryden, West Roxbury, MA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 104 days.

(21) Appl. No.: 15/210,936

(22) Filed: Jul. 15, 2016

(51) Int. Cl.
*G06K 9/00* (2006.01)
*G06T 7/60* (2017.01)
*G06T 7/00* (2017.01)

(52) U.S. Cl.
CPC ............ *G06T 7/602* (2013.01); *G06T 7/0004* (2013.01); *G06T 2200/04* (2013.01); *G06T 2207/30112* (2013.01)

(58) Field of Classification Search
CPC .......... G06T 7/0004; G06T 7/62; G06T 7/73; G06T 2200/04; G06T 2207/30112; G01B 5/004; B65G 67/00; B65G 47/244
USPC ................................................. 382/103, 141
See application file for complete search history.

(56) References Cited

U.S. PATENT DOCUMENTS

| | | | |
|---|---|---|---|
| 6,517,004 B2* | 2/2003 | Good | G02B 26/106 235/462.01 |
| 2013/0342353 A1 | 12/2013 | Choi et al. | |
| 2014/0015963 A1 | 1/2014 | Klaas | |
| 2015/0042791 A1* | 2/2015 | Metois | G01B 21/02 348/135 |

(Continued)

FOREIGN PATENT DOCUMENTS

| | | |
|---|---|---|
| CN | 202188830 | 4/2012 |
| CN | 104330038 | 2/2015 |

OTHER PUBLICATIONS

Focker, F. et al; Real-time cargo volume recognition using internet-connected 3D scanners; Evaluation of Novel Approaches to Software Engineering (ENASE), 2015 International Conference on, Barcelona, Spain, 2015; pp. 323-330.

(Continued)

*Primary Examiner* — Daniel Mariam
(74) *Attorney, Agent, or Firm* — Patti & Malvone Law Group, LLC

(57) ABSTRACT

An exemplary apparatus determines the dimensions of a package while being moved by a transport through a scanning zone. Sensors with different respective fields of view are disposed about a scanning zone and generate corresponding frames of 3-D images where some of the points represent the transport and package. A computing apparatus translates the points in the images into a transport coordinate system with a common point of origin on the transport so that the package does not appear to be in motion from frame to frame. The computing apparatus merges the translated (Continued)

points in different frames into a combined point cloud image and deletes points representing the transport resulting in a final point cloud image of the package. The computing apparatus determines the dimensions of the package based on the location of points representing the package in the final point cloud image.

19 Claims, 4 Drawing Sheets

(56) References Cited

U.S. PATENT DOCUMENTS

| | | | | |
|---|---|---|---|---|
| 2015/0360877 | A1* | 12/2015 | Shin | B65G 43/08 |
| | | | | 382/103 |
| 2017/0227629 | A1* | 8/2017 | Sorensen | G01G 19/083 |
| 2017/0280125 | A1* | 9/2017 | Brown | H04N 13/0018 |

OTHER PUBLICATIONS

Prasse, C. et al; New approaches for singularization in logistic applications using low cost 3D sensors; In Sensing Technology: Current Status and Future Trends IV, pp. 191-215; Springer International Publishing, 2015.

Kuckelhaus, M. et al; Low-cost sensor technology—A DHL perspective on implications and use cases for the logistics industry M. Wegner, ed. Available at: http://www.dhl.com/en/about_us/logistics_insights/dhl_trend_research/low_cost_sensor_trend_report.html#.VvqaODFwsgs; Dec. 2013.

Dellen, B. et al; Volume measurement with a consumer depth camera based on structured infrared light; in Proceedings of the 16th Catalan Conference on Artificial Intelligence, poster session, pp. 1-10; 2013.

Bondarev, E. et al: On photo-realistic 3D reconstruction of large-scale and arbitrary-shaped environments; Consumer Communications and Networking Conference (CCNC), 2013 IEEE, Las Vegas, NV, 2013; pp. 621-624; The 10th Annual IEEE CCNC—Work-in-Progress; 978-1-4673-3133-3/13.

* cited by examiner

APPARATUS AND METHOD FOR DETERMINING THE DIMENSIONS OF A PACKAGE WHILE IN MOTION

BACKGROUND OF THE INVENTION

The present invention generally relates to the measurement of packages and more specifically relates to determining the dimensions of a package while the package is being moved by a transport.

Determining the external dimensions of the package is important in many situations. For example, in the commercial transportation of packages, tariffs may be based on the dimensions of the package being transported in addition to or instead of the weight of the package. More particularly, a "bounding box" may form the basis for a tariff. A bounding box is generally known as the smallest rectangular solid box that can enclose the package. Thus, determining the dimensions of a package or its bounding box is especially important in the commercial transportation of packages.

Measuring the dimensions of a package may be made in various ways. For example, a tape measure or other measuring device may be used to manually determine the dimensions of a package. However, for a high volume commercial transportation of packages center, making such manual measurements introduces significant delays and burdens. An automated system for determining the dimensions of the package is available. In this system an overhead frame supports sensors oriented to scan stationary packages on a target floor area below the frame. In an exemplary use of such a system, a package carried by forklift truck is placed on the target floor area, the forklift truck retreats out of the range of the sensors, the sensors scan the stationary package and make a dimension determination, and then the forklift truck returns to pick up and move the package to another location. Such a system introduces delays and imposes burdens by requiring all packages to be unloaded and reloaded by the forklift truck at a particular fixed target location. These burdens are magnified in a high-volume package transport center where such handling and measurement wait times for each package combine to make substantial adverse labor costs and time delays.

SUMMARY OF THE INVENTION

There exists a need for a more efficient way to determine the dimensions of the package. The present invention is a system comprising an apparatus for obtaining dimensional data for packages while being moved on a transport through a field of view of sensors and for determining the dimensions of the packages from the dimensional data. The present invention also comprises a method by which the dimensional data for the packages while being carried by a transport is obtained and utilized to determine the package dimensions and/or a bounding box dimension for the package.

An exemplary apparatus determines the dimensions of a package while being moved by a transport through a scanning zone. Sensors with different respective fields of view are disposed about a scanning zone and generate corresponding frames of 3-D images where some of the points represent the transport and package. A computing apparatus translates the points in the images into a transport coordinate system with a common point of origin on the transport so that the package does not appear to be in motion from frame to frame. The computing apparatus merges the translated points in different frames from various points of view into a combined point cloud image and deletes points representing the transport, floor, and surrounding structure resulting in a final point cloud image of the package. The computing apparatus determines the dimensions of the package based on the location of points relative to the common point of origin representing the package in the final point cloud image.

An exemplary method is utilized to determine the dimensions of the package based on the location of points in an image representing the package where the image information collected of the transport and package are acquired while the in motion transport carrying the package passes through a scanning zone.

BRIEF DESCRIPTION OF THE DRAWINGS

The features and advantages of the invention will become apparent from the following description in conjunction with the accompanying drawings, in which reference characters refer to the same parts throughout the different views. In the drawings.

DETAILED DESCRIPTION OF THE INVENTION

Figure 1:
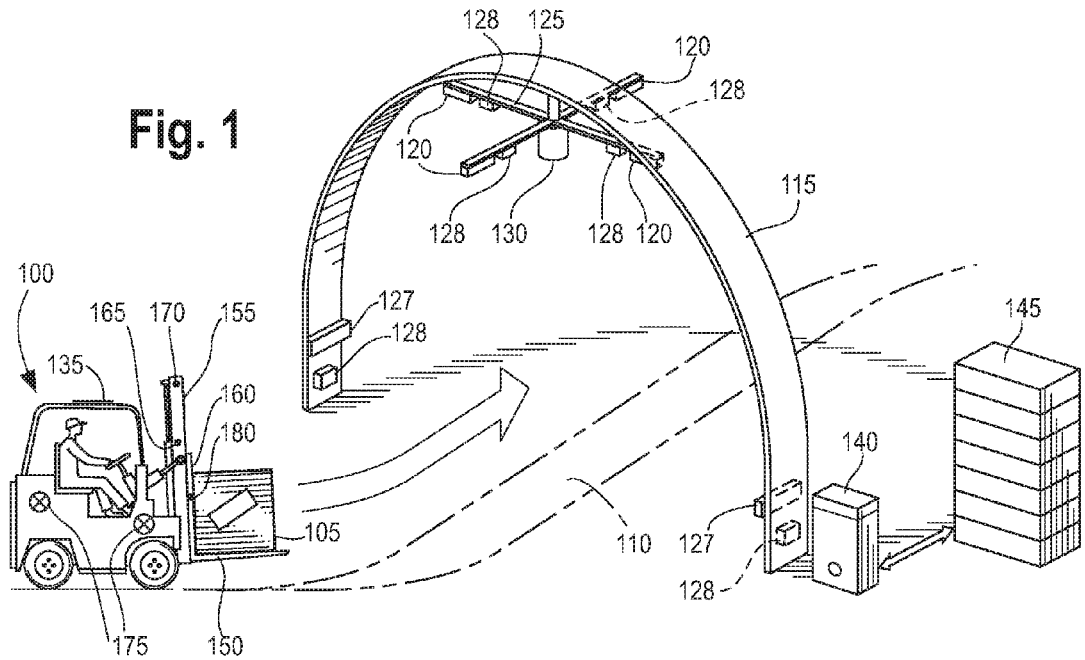
FIG. 1 depicts an embodiment of the present invention in relation to a forklift carrying a package to be measured.

FIG. 1 shows a transport 100, e.g. a forklift truck, that is in motion and carrying a package 105, e.g. a rectangular solid, on a path 110 that passes beneath the framework 115, e.g. an arch, that supports sensors in accordance with an embodiment of the present invention. The sensors and computing apparatus determine the dimensions of package 105 as the transport 100 carries it through a scanning zone, i.e. the field of view of the sensors. That is, the dimensions of package 105 are determined in accordance with an embodiment of the present invention while the transport 100, and hence the package 105, remains in continuous but not necessarily uniform motion along path 110 and passes through the scanning zone located near the arch. Transport 100 could alternatively comprise a sled on which the package is being pulled by a person or machine, a flatbed truck or vehicle, a two wheeled hand truck, a four wheeled dolly, etc. Four arms 125 generally arranged in a "plus sign or cross" pattern are attached to an overhead midsection of framework 115 and support respective ones of four sets of electro-optical sensors 120 and corresponding computing apparatus 128 in the exemplary embodiment. As an illustrative example, the arms 125 support the sensors 120 in a generally horizontal plane with each sensor being approximately 20 feet from the other three sensors. However, a different number of sensors with different spacing between the sensors could be utilized dependent on the capability of the sensors and the desired accuracy of the package dimensions. It is believed that at least two spaced-apart sensors disposed above the transport/package are desirable to provide sufficient visual information from different angles of view to enable the desired performance.

Various types of sensors 120 can be utilized to collect snapshots, e.g. frames, of dimensional data as the transport 100 and package 105 pass through the field of view of these sensors where each sensor has a different field of view orientation that is generally downward and inward looking toward the path 110 which is preferably centered within the arch. In the exemplary embodiment, the sensors are time-of-flight (TOF) sensors, e.g. version II of Kinect TOF sensors from Microsoft Corporation. Other types of sensors could be also be used, e.g. light imaging, detection and ranging (LIDAR). TOF sensors transmit a modulated pulse of light to illuminate the field of view and have an array of pixel image sensors that detect returning light reflected off surfaces in the field of view similar to the way a digital camera records light reflected from objects in the field of view of the lens. Each pixel in the array is processed by the sensor to produce a light intensity value (similar to the capture of light by a digital camera) and also produces a time delay value where the time delay is proportional to the distance between the TOF sensor and the surface reflecting the light. The position of the pixel in the array can be thought of as defining a ray in 3-D space with its origin located at the sensor, and the corresponding time delay value as translated into a distance from the origin of the ray along the direction of the ray, thereby defining a point in three dimensional space. A separate calibration of the sensor that measures the ray vector in 3-D space for each pixel is combined with the distance along the ray for each pixel to derive the point in 3-D space which corresponds to each sensor pixel for each frame of data. The difference between a 3-D location for point A in one image frame compared with the 3-D location for the same point A on the transport 100 or package 105 in a next image frame combined with the time between frames can be utilized to determine the rate of travel (speed vector) for point A on the transport or package in 3-D space. Each TOF sensor captures a number of sequential image frames as the transport 100 and package 105 pass through the field of view, with each frame containing a collection of 3-D points with the collection of points in one image frame comprising a point cloud. Each pair of sensors 120 and corresponding computing apparatus 128 is referred to as a sensor processing unit (SPU).

Two additional SPUs consisting of TOF sensors 127 and corresponding computing apparatus 128 are disposed laterally on opposing sides of path 110 with the sensors 127 being supported by the arch 115 a distance above the floor at about the height of the vertical center of anticipated typical packages, e.g. 3 feet. The field-of-view of sensors 127 are substantially perpendicular to and facing the path 110 to best capture respective side dimensional data of the transport 100 and package 105 as the latter passes underneath the arch along path 110. In the illustrated embodiment, these lateral SPUs enhance the accuracy of package measurement determinations especially for packages having unusual shapes. However, package measurement determinations may be made without the use of the lateral SPUs depending on the types of packages to be measured and the required degree of accuracy.

A transport identifying sensor 130, e.g. a visual sensor/camera, is mounted near the top of the arch and has a generally downward field-of-view. The sensor 130 should be capable of capturing indicia 135, e.g. a barcode, etc., disposed on the roof of transport 100 with sufficient resolution to enable accurate decoding of the indicia. Alternatively, the sensor 130 may record an image of the rear of the transport 100 which has a unique identifier or license plate, or the sensor 130 may be an RFID receiver for sensing an RFID tag associated with the transport 100. As will be explained in more detail, identifying the specific transport 100 is desired in order to enable subsequent image processing to delete or ignore the pixels representing the transport 100 when making dimensional determinations of the package 105. Alternatively, a separate transport identifying sensor may not be required if the sensors 120 are capable of providing sufficient resolution of transport indicia to enable transport identification.

A package processing unit (PPU) 140, e.g. a computing apparatus, provides centralized support for the operation of the SPUs and makes the ultimate determination of the dimensions of the package 105 and the bounding box dimensions for the package. In this exemplary embodiment, PPU 140 has bidirectional data communications with each of the SPUs as well as sensor 130. A shipping center database 145 receives package dimensions made by PPU 140 along with the identification of the transport 100 associated with the transportation of the package during the dimensioning process. This enables the determined dimensions to be associated with the corresponding package since identification of the package being carried by the transport as it passes through the scanning zone will be known and stored in database 145. Alternatively, indicia on the package itself as captured by one or more sensors can be decoded to identify the specific package for which corresponding dimensions are determined. The dimensional information of the package may be utilized by the database 145 to make additional decisions, e.g. where to place packages in a tractor-trailer based on dimensions/bound box in order to maximize package carrying capacity, an appropriate tariff to be charged if the tariff is to be based on package dimensions, etc.

In the exemplary embodiment, transport 100 is assumed to be a forklift truck. Typically, the forklift truck will have two parallel forks or tines 150 which support the package being carried. These forks 150 may be raised or lowered parallel to vertical masts 155. The vertical masts 155 may also be tilted relative to the vertical together with the tines 150 supporting the package. A fence 160 at the rear of forks 150 may provide rearward support for the package being transported and provides protection for the operator. The fence 160 is raised or lowered together with forks 150 and the package 105. In the illustrated embodiment, fiducial marks 165 and 170 are disposed along the outside lateral faces of each of the masts 155 to provide indicia for determining the 3-D location and movement of the forklift truck as well as the tilt of the masts 150 as they move through the field of view of the sensors. Additional fiducial marks 175 on the left and right sides of the forklift 100 provide additional indicia that help to determine the orientation of the forklift 100. Fiducial marks 180 on the fence determine the height of the forklift tines 150 as they are raised or lowered parallel to the mast 155. The 3-D location and movement of the forklift truck as well as the tilt of the mast and the height of tines is determined by a series of sequential image frames captured by the SPUs as the forklift 100 traverses the field-of-view of the sensors.

Figure 2:
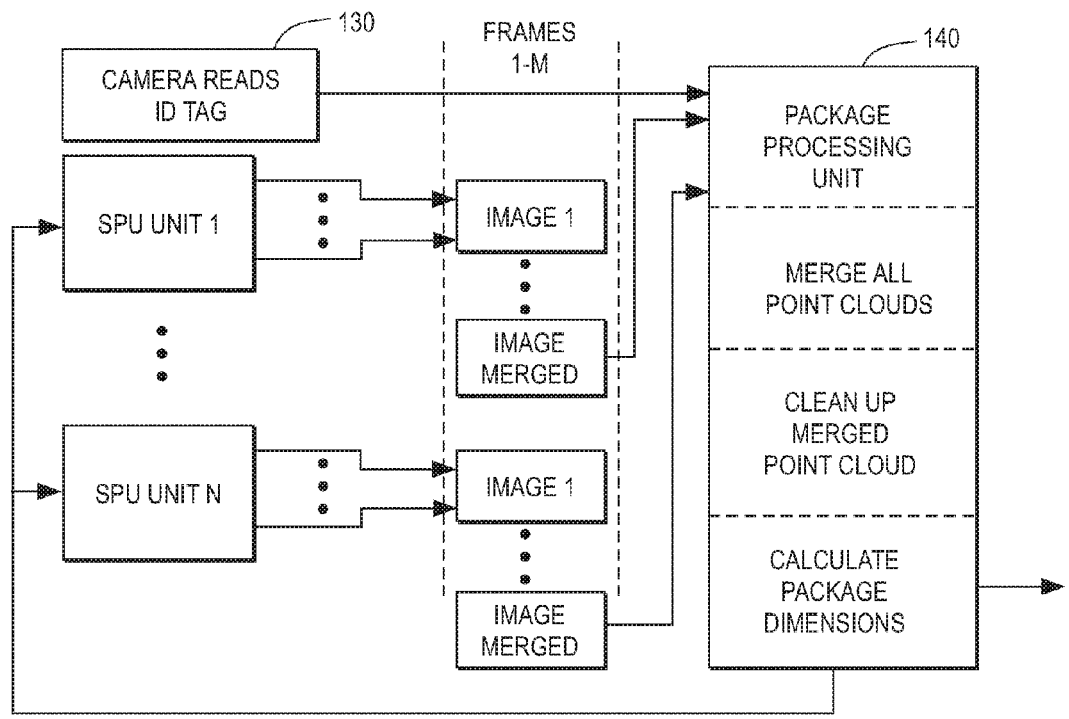
FIG. 2 provides a simplified overview of the operation of the embodiment of the present invention.

FIG. 2 provides a simplified overview of the operation of the illustrative embodiment. As indicated a camera 130 reads the identification tag 135 associated with the transport 100. This transport identification information is transmitted to the PPU 140 which decodes the identification tag and identifies a specific transport from a stored database of transport images indexed by transport identification. As a preliminary step to determining package dimensions, each transport is identified and characterized by a 3D point cloud without carrying a package; the corresponding point cloud and the corresponding transport identification are stored in memory for later use. The corresponding point cloud image of the transport is transmitted to the SPUs.

As illustrated, a number of SPU units 1-N each capture frames 1-M while the transport 100 and package 105 are within the field of view of the sensors. For example, each SPU may capture about 70 frames of images of which approximately 30 frames are the most relevant representing the time interval during which the transport and package were within the primary field of view of the SPU's sensor. As another preliminary step, each of the sensors of the SPUs is optically calibrated and the precise sensor location and orientation in 3-D space is determined and stored. Using this information the point cloud images contained in the relevant frames from all of the sensors are transformed into a common coordinate system. Using the fiducial markings contained in images sent from the SPUs, the PPU determines the position and orientation of the transport relative to the common coordinate system for each frame from each sensor. Knowing the exact positions and relationships among the marks as determined in a preliminary step, and knowing the exact time of each frame, a complete 6 degree of freedom smooth trajectory of the transport as a function of time can be determined. Although the SPUs in this exemplary embodiment are operating continuously and asynchronously, a common master clock, e.g. provided by the PPU, is utilized to facilitate a timestamp fixed to each frame so that the PPU can discern the time of each frame from each SPU.

Based on the smooth 6 degree of freedom trajectory of the transport as a function of time received by the SPUs from the PPU 140, each SPU translates the common coordinate system of the point cloud in each frame into a transport based coordinate system relative to a point of origin on the transport, e.g. the intersection of the corner formed by the right fork 150 of the transport and the fence 160. Each SPU then merges the point cloud of all relevant frames relative to a single pass of the transport into a single merged point cloud frame based on the point of origin on the transport. Using this merged point cloud, each SPU retrieves the stored point cloud of the identified transport from memory (which uses the transport based point of origin) and deletes/ignores the points associated with the transport with negative values, i.e. to the left of the fence 160 in transport based coordinate origin as seen in FIG. 1, thus leaving a point cloud representing only the package and supporting forks of the transport. This point cloud is transmitted by each SPU to the PPU which combines these point clouds into a single integrated point cloud. The PPU, using the single integrated point cloud, makes a final cleanup removing the points representing the transport to right of the transport coordinate origin, e.g. forks, determines final package edges, and determines the dimensions of the package and a corresponding bounding box.

Figure 3:
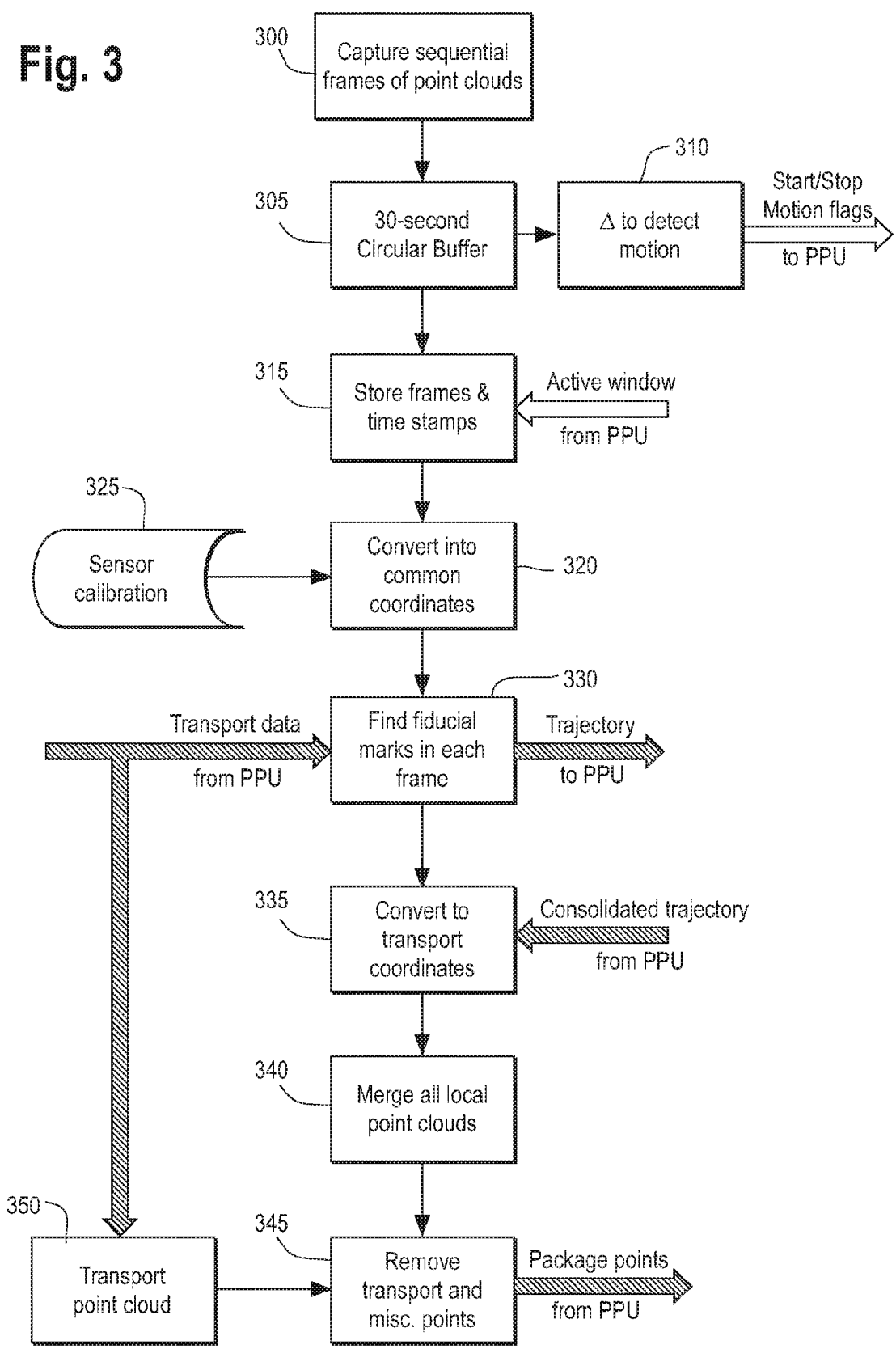
FIG. 3 shows illustrative steps taken by an exemplary sensor processing unit in accordance with an embodiment of the present invention.

FIG. 3 shows illustrative steps taken by an exemplary sensor processing unit. In step 300 the TOF sensor of the SPU continuously captures sequential frames of point clouds, e.g. 30 frames per second, that are continually transferred to the computing apparatus of the SPU. As indicated in step 305 the computing apparatus of the SPU utilizes a circular storage buffer to store frames during an approximate 30 second time interval. The time interval of the circular storage buffer is only limited by the TOF sensor data rate and the amount of memory in the SPU and allows capture and storage of a high rate burst of transports carrying packages which temporarily may exceed the processing capabilities of the SPU and PPU. In step 310 the point cloud images in the sequential frames stored in the circular buffer are periodically analyzed to detect motion, e.g. a set of points in the field of view of the TOF sensor in a point cloud at one location in one frame are determined to appear at another location in a following frame. Each SPU periodically transmits a motion detection flag to the PPU. In order to increase reliability, detection of a valid transport motion event may require a determination that the same set of points has moved in location over a series of frames from multiple SPU, e.g. during five consecutive frames from at least 3 SPUs. In step 315 the PPU has determined that an active window exists, i.e. a time interval has begun in which a transport is beginning to pass through the field of view of the TOF sensors. This continues until the PPU determines that there is no longer an active window, i.e. the sensing of motion has ceased. Upon the detection and cessation of motion, start/stop motion flags and the times of the start and end of the motion are calculated by the PPU. This results in frames beginning with the time of the start of motion and ending with the time of the end of motion being copied from the circular buffer in each SPU along with their associated time stamps into other RAM memory in each SPU for processing. In step 320 the point cloud images in each of the frames stored in step 315 in each SPU are converted into a common 3D coordinate system with a common point of origin. Prior to the conversion into a common 3-D coordinate system, each captured point in the point cloud is converted from a 2-D space with associated timing information into a 3-D system with the third dimension based on distance derived from the corresponding timing information. This locates each point in the point cloud in a 3-D coordinate system. In step 325, which is preferably performed as a preliminary step prior to the active operation of the dimensioning system, each TOF sensor is optically calibrated and its spatial 3D location relative to a common point in space is determined. This information is utilized by step 322 transform the location of the points in the point cloud into the common 3-D coordinate system.

In step 330 the point cloud in each frame is searched to find the fiducial marks on the transport. This information which assists in determining the location and trajectory of the transport is transmitted to the PPU. Each of the SPUs transmits the fiducial mark information for each frame to the PPU which collects all such information and integrates it to provide a combined, smoothed, more accurate 6 degree of freedom and trajectory as a function of time for the transport based on the integration of the information from each of the SPUs. As shown, transport data representing the geometry of the transport and the locations of the fiducials on the transport (obtained in a preliminary calibration step) is transmitted from the PPU to the SPU to assist step 330 in determining where fiducial marks exist in each of the process frames.

In step 335 each point in the point cloud represented by a coordinate in the common 3-D coordinate system is converted to a corresponding 3-D point in a point cloud in the transport based coordinate system in which the respective origin point is based on a point of reference on the transport using the smooth 6 degree of freedom trajectory of the transport as a function of time. In the transport based coordinate system, points representing the package will not appear to move from frame to frame to an observer. As shown, consolidated 6 degree of freedom trajectory information is provided from the PPU to the SPU at step 335 to assist in conversion of the coordinate systems so that the point of origin in the transport based coordinate system remains static frame to frame. Without the conversion to the transport based coordinate system, the successive frames would appear to an observer as frames in a movie in which the transport/package changes position from frame to frame. With the conversion to the transport based coordinate system, the successive frames will appear to an observer like time-lapse photographs of the transport/package that is not in motion.

In step 340 all of the point cloud frames obtained by each SPU after being converted to the transport 3-D coordinate system are merged to form a single combined point cloud. In step 345, which operates on the single combined point cloud, points representing the transport and miscellaneous noise and spurious outlying points are deleted from the single combined point cloud. At step 350 the point cloud for only the transport as provided from the PPU is stored in memory in each SPU for use in step 345. That is, most of the points in the single combined point cloud which correspond to points in the transport point cloud are deleted. Because of potential ambiguity in the deletion of the forks of the forklift truck being adjacent and next to the package to be measured, deletion of the forks may be reserved for processing by the PPU. There will likely exist noise points in the combined point cloud especially near the edges of the package. Because such noise points will appear at different locations in different frames, these points can be identified as being noise and thus removed. For example, unless the same point appears in 3 or more frames, the point will be considered to by noise and deleted. There will also be background points in the single combined point cloud that represent part of the surrounding environment captured in each frame. From the point of view of the transport based coordinate system, the background points will appear to move from frame to frame, and hence can be identified and removed. Following the operation by step 345, the "cleaned up" single combined point cloud image is transmitted to the PPU for further processing.

Figure 4:
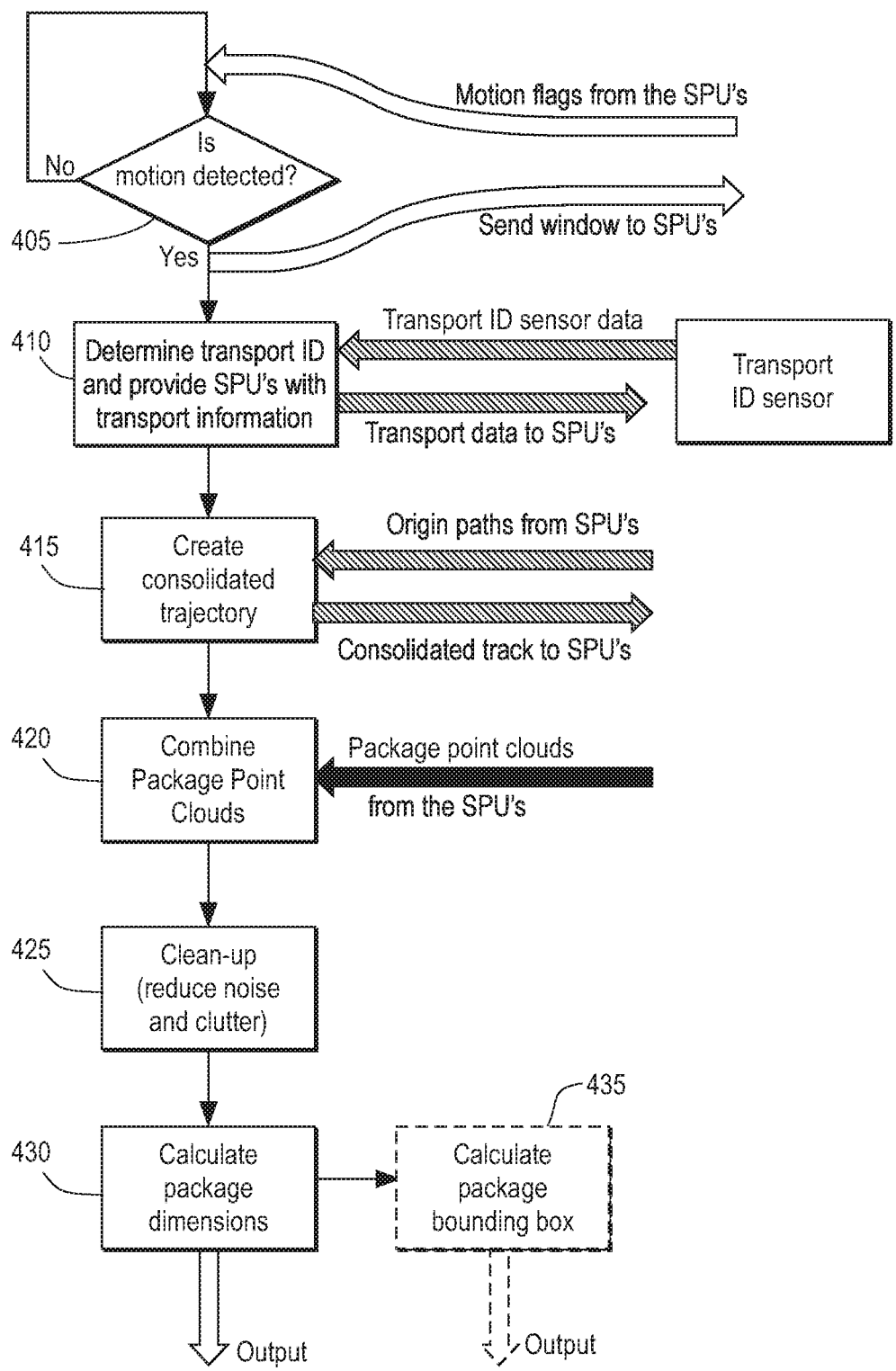
FIG. 4 shows exemplary steps taken by an exemplary package processing unit in accordance with an embodiment of the present invention.

FIG. 4 shows exemplary steps taken by the package processing unit 140. In step 405, the decision is made if motion is detected, indicating the passage of a transport through frame 115, based on motion flags received from the SPUs. A NO decision, indicating a transport is not traversing the scanning zone in the frame, results in continuing processing by step 405. A YES decision results in the PPU sending an active window signal to the SPUs causing the latter to store frames of information for processing. Also following a YES decision by step 405, step 410 determines the identification of the transport and provides the SPUs with transport information, i.e. identity of the transport, geometry of the transport, and information relating to the location of the fiducial markings on the particular transport. Transport identity information is obtained from the transport ID sensor. In step 415 the PPU creates a consolidated 6 degree of freedom trajectory as a function of time based on fiducial marking locations in point clouds from the SPUs in successive frames. The PPU transmits the consolidated trajectory information to the SPUs for use as explained with regard to FIG. 3. In step 420 the single cleaned up integrated point clouds from each of the SPUs are received and combined to form a package point cloud. In step 425 the package point cloud determined in step 420 is further cleaned up to reduce noise and clutter. Noise points can be identified as random points which do not exist in substantially all of the SPU frames. Space can be divided into 3-D blocks called voxels and the number of points in each voxel can be counted. If the number of points in each voxel is below a threshold all of the points in the voxel are deleted. Additionally, any remaining portions of the transport, e.g. forks of the forklift which are adjacent the package, can be identified and removed leaving only the package and the resulting image transferred to step 430. The dimensional information of interest relating to the package is processed in step 430 using trigonometric identities among the three axes in the 3-D transport coordinate system to determine distances in X, Y and Z dimensions. Even if a package has an irregular shape, e.g. a rectangular solid box with a half of a baseball bat protruding from one surface, a 3-D image of the exact package is available so that dimensions of even irregular shapes can be made. In step 435 bounding box dimensions for the subject package are determined. The bounding box dimensions can be determined based on the smallest length in each of the three axis dimensions that will contain the actual package. Both the package dimensions and the bounding box dimensions are available as outputs from the PPU for further utilization by the shipping center database 145.

Figure 5:
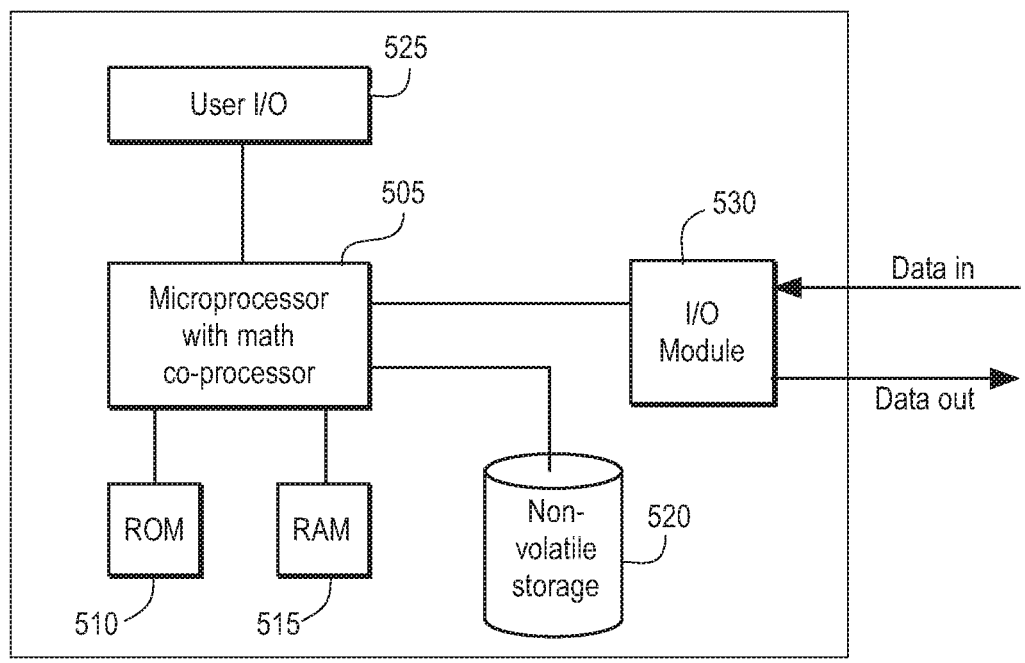
FIG. 5 is a block diagram of an exemplary computing apparatus suitable for implementing the sensor processing unit and the package processing unit.

FIG. 5 is a block diagram of an exemplary computing device suitable for implementing the computing apparatus portion of the SPU and the PPU. The exemplary computing device includes a microprocessor with math coprocessor 505 that is connected to and supported by read-only memory (ROM) 510, random-access memory (RAM) 515 and non-volatile memory storage 520, e.g. a hard drive, etc. User input/output (I/O) 525 includes various types of user interface devices, e.g. a monitor or other display device, printer, keyboard, mouse, etc. The input/output (I/O) module 530 provides a communication interface with the microprocessor 505 that supports the reception and transmission of data from other devices. Any of several known operating systems may be utilized to control the overall operation of the computing device and interface with stored application programs utilized to perform the functions as described herein for the computing apparatus of the SPU or the PPU.

Assuming the computing device represents the computing apparatus of the SPU, software application programs and/or routines support the following functions. A device driver interfaces with the sensor hardware and loads a continuous stream of sensor data into memory. A function transforms the raw sensor data to a point cloud of 3-D points in the sensor coordinate system. Another function uses a transformation matrix to transform the points from one coordinate system to another, which is used to transform the points from the sensor coordinate system to the common coordinate system and later to transform from the common coordinate system to the transport coordinate system. A function locates transport fiducials in 3-D space. A function generates a transformation matrix from a 6 degree of freedom smooth trajectory and a specific instant in time. Another function clips points in a point cloud, excluding points that lie inside a specified volume or outside a specified volume. Communications between a SPU and the PPU are arranged so that commands from the PPU can be executed remotely on a SPU and so that data can be transmitted bidirectionally between the SPU and the PPU. These functions may all be written in common computer languages such as C or C++ and/or high level organization and control flow written in a scripting language such as Python or Ruby for flexibility.

Assuming the computing device represents the PPU, software application programs and/or routines support the following functions. A function to recognize a valid transport motion event and to reject motion caused by people or other moving objects traveling within the field of view of the system. A function to determine a smooth 6 degree of freedom trajectory as a function of time from a set of time stamped fiducial measurements and the geometry of the fiducials. Other functions reject outlying or spurious points from a set of one dimensional measurements and from a 3-D point cloud. A function determines the minimum bounding box from a point cloud. A function statistically analyzes a noisy point cloud and determines the most likely extents of the bounding box. Communications between the PPU and the SPU permit the PPU to control the execution of functions remotely on the PPU and transmit data bidirectionally between the PPU and the SPU. Communication between the PPU and a customer computing device enables the reporting of the dimensions, time, and identity of the transport device. Supervisory code orchestrates the execution of functions on the SPUs to achieve the desired results. These functions may all be written in common computer languages such as C or C++ and/or high level organization and control flow written in a scripting language such as Python or Ruby for flexibility. The above described programs and/or routines can be implemented by one skilled in this field based on the teachings and descriptions provided herein.

This invention is not limited to the described implementation and the arrangement of components in the preceding description or illustrated in the drawings. The method of the invention may be practiced using alternate or additional steps, combination of steps or different arrangement of steps. For example, all of the computing apparatus of the SPUs could be combined into a single computer or integrated into the PPU. The sensors my use structured light or stereoscopy rather than TOF to supply three dimensional data. Motion within the field of view may be detected by commercial motion sensors rather than derived from the sensor stream. The dimensions of a package transported on a conveyor belt where the motion can be characterized by one degree of freedom can be determined by the exemplary embodiment which would require substantially less processing due to the limited freedom of motion of the package. The techniques described herein are also applicable to determining the dimensions of a package that is stationary, at least for a period of time in the sensing zone, in which the transport carrying the package does not deposit the package on the floor and withdraw, obviating the need for the transport to withdraw from the measurement volume as required for other measuring techniques. If the transport is always identical and immutable (e.g. no tilting masts or variable height forks) the number of fiducials can be reduced and the processing considerably simplified since processing to determine each of these variables will no longer be required. In addition to this technique being used for a stationary sensor system to the dimension a moving item, it can also be used by a mobile/moving sensor system to dimension a stationary or moving item.

The invention claimed is:

1. An apparatus for determining the dimensions of a package while being moved by a transport through a scanning zone, the apparatus comprising:
    a plurality of three-dimensional point-location sensors, each of said sensors disposed at a different location on a periphery of the scanning zone and having different respective fields of view of the scanning zone;
    each of said sensors generating frames of three-dimensional point cloud images corresponding to the field of view of the respective sensors where some of the points in some of the point cloud images represent the transport and package;
    a computing apparatus translates the points in the three-dimensional point cloud images into a transport coordinate system in which x, y and z axes have a common point of origin that is based on a transport reference point so that points in different frames that represent the package do not appear to be in motion from frame to frame;
    the computing apparatus merges the translated points in different frames into a combined point cloud image and deletes points representing the transport based on a stored point cloud image of the transport resulting in a final point cloud image of the package;
    the computing apparatus determines the dimensions of the package based on the location of points representing the package in the final point cloud image.

2. The apparatus of claim 1 further comprising:
    the computing apparatus determines the location and three dimensional orientation of the transport and the configuration of any significant mutable elements of the transport in each frame based on identifying location and orientation of fiducial marks on the transport and comparing with stored information of positions and dimensional orientations of the fiducial marks on the transport mutable elements so that the x, y and z axes and the common point of origin are in alignment from frame to frame.

3. The apparatus of claim 2 further comprising:
    a transport identification sensor that senses identification information associated with each transport where each transport has unique identification information;
    memory associated with the computing apparatus stores the location and orientation of fiducial marks for each transport and the corresponding unique identification information so that the location and orientation of fiducial marks for each transport can be retrieved based on the unique identification information.

4. The apparatus of claim 1 wherein:
    the computing apparatus translates the points in the three-dimensional point cloud images for each three-dimensional point-location sensor into a transport coordinate system in which x, y and z axes have a common point of origin that is based on a transport reference point so that points in different frames that represent the package do not appear to be in motion from frame to frame;
    the computing apparatus merges the translated points in different frames for each sensor into a single integrated point cloud image for each sensor and deletes points representing the transport based on a stored point cloud image of the transport;
    the computing apparatus merges the single integrated point cloud image for each sensor into a combined point cloud image representing all sensors resulting in a final point cloud image of the package.

5. The apparatus of claim 1 further comprising:
    the computing apparatus determining that the transport is within the scanning zone based on at least some points in the three-dimensional point cloud images from one or more sensors appearing in different locations in consecutive frames.

6. The apparatus of claim 1 further comprising:
    a frame located adjacent the scanning zone on which at least some of said sensors are mounted at a height above a floor of the scanning zone so as to have a corresponding field of view that is below horizontal.

7. The apparatus of claim 1 wherein the plurality of three-dimensional point-location sensors includes at least two of said sensors each with a different field of view towards a center line of the scanning zone and each located on opposing sides of the scanning zone.

8. The apparatus of claim 1 wherein the plurality of three-dimensional point-location sensors includes at least four of said sensors each with a different field of view towards a center line of the scanning zone.

9. The apparatus of claim 1 wherein each of said sensors generates more than 20 frames per second of three-dimensional point cloud images from which the computing apparatus can determine the dimensions of the package based on the location of points representing the package in the final point cloud image where the package is being carried by a transport moving at a speed of 4 to 8 miles per hour through the scanning zone.

10. The apparatus of claim 1 further comprising:
the computing apparatus determines, based on the dimensions of the package, a bounding box dimension for the package.

11. A method for determining the dimensions of a package while being moved by a transport through a scanning zone, the method comprising the steps of:
generating frames of three-dimensional point cloud images by a plurality of sensors where each sensor has a different field of view of the scanning zone, some of the points in some of the point cloud images represent the transport and package;
translating the points in the three-dimensional point cloud images into a transport coordinate system in which x, y and z axes have a common point of origin that is based on a transport reference point so that points in different frames that represent the package do not appear to be in motion from frame to frame;
merging the translated points in different frames into a combined point cloud image;
deleting points representing the transport based on a stored point cloud image of the transport from the combined point cloud image resulting in a final point cloud image of the package; and
determining the dimensions of the package based on the location of points representing the package in the final point cloud image.

12. The method of claim 11 further comprising:
determining the location and three dimensional orientation of the transport and the configuration of mutable elements of the transport in each frame based on identifying location and orientation of fiducial marks on the transport and comparing with stored information of positions and dimensional orientations of the fiducial marks on the transport so that the x, y and z axes and the common point of origin are in alignment from frame to frame.

13. The method of claim 12 further comprising:
sensing identification information associated with each transport where each transport has unique identification information;
storing the location and orientation of fiducial marks for each transport and the corresponding unique identification information so that the location and orientation of fiducial marks for each transport can be retrieved based on the unique identification information.

14. The method of claim 11 wherein:
translating the points in the three-dimensional point cloud images for each three-dimensional point-location sensor into a transport coordinate system in which x, y and z axes have a common point of origin that is based on a transport reference point so that points in different frames that represent the package do not appear to be in motion from frame to frame;
merging the translated points in different frames for each sensor into a single integrated point cloud image for each sensor;
deleting points representing the transport based on a stored point cloud image of the transport;
merging the single integrated point cloud image for each sensor into a combined point cloud image representing all sensors resulting in a final point cloud image of the package.

15. The method of claim 11 further comprising:
determining the presence of the transport in the scanning zone based on at least some points in the three-dimensional point cloud images from one or more sensors appearing in different locations in consecutive frames.

16. The method of claim 11 further comprising:
mounting on a frame located adjacent and above a floor of the scanning zone at least some of said sensors at a height above the floor so as to have corresponding fields of view that are below horizontal.

17. The method of claim 11 wherein the plurality of three-dimensional point-location sensors includes at least two of said sensors each with a different field of view towards a center line of the scanning zone and each located on opposing sides of the scanning zone.

18. The method of claim 11 wherein the plurality of three-dimensional point-location sensors includes at least four of said sensors each with a different field of view towards a center line of the scanning zone.

19. The method of claim 11 wherein more than 20 frames per second of three-dimensional point cloud images are generated by each of said sensors, and the dimensions of the package based on the location of points representing the package in the final point cloud image are determined where the package is being carried by a transport moving at a speed of 4 to 8 miles per hour through the scanning zone.

* * * * *